(12) United States Patent
Tisol, Jr.

(10) Patent No.: US 11,815,124 B2
(45) Date of Patent: Nov. 14, 2023

(54) FASTENER ASSEMBLY

(71) Applicant: ILLINOIS TOOL WORKS INC., Glenview, IL (US)

(72) Inventor: James S. Tisol, Jr., Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/675,457

(22) Filed: Feb. 18, 2022

(65) Prior Publication Data
US 2022/0282746 A1 Sep. 8, 2022

Related U.S. Application Data

(60) Provisional application No. 63/157,307, filed on Mar. 5, 2021.

(51) Int. Cl.
*F16B 5/06* (2006.01)
*F16B 21/08* (2006.01)

(52) U.S. Cl.
CPC .......... *F16B 5/0657* (2013.01); *F16B 21/086* (2013.01)

(58) Field of Classification Search
CPC .............................. F16B 5/0657; F16B 21/086
See application file for complete search history.

(56) References Cited

U.S. PATENT DOCUMENTS

| | | | | |
|---|---|---|---|---|
| 5,195,793 | A  * | 3/1993 | Maki | F16B 5/128 |
| | | | | 24/297 |
| 7,337,505 | B1 * | 3/2008 | Scroggie | F16B 5/0657 |
| | | | | 24/297 |
| 7,481,474 | B2 * | 1/2009 | Higgins | F16B 21/086 |
| | | | | 24/297 |
| 7,698,787 | B2 * | 4/2010 | Scroggie | F16B 21/082 |
| | | | | 411/24 |
| 8,671,528 | B2 * | 3/2014 | Hayashi | F16B 21/086 |
| | | | | 24/297 |
| 9,670,947 | B2 * | 6/2017 | Bachelder | B60R 13/0206 |
| 9,938,997 | B2 * | 4/2018 | Iwahara | F16B 5/0664 |
| 9,956,925 | B2 * | 5/2018 | Akazawa | F16B 2/22 |
| 10,125,804 | B2 * | 11/2018 | Krippl | F16B 21/09 |
| 10,471,909 | B2 * | 11/2019 | Abe | B60J 10/36 |
| 10,808,745 | B1 * | 10/2020 | Javali | F16B 21/086 |
| 11,519,442 | B2 * | 12/2022 | Lepper | F16B 5/0657 |
| 2003/0159256 | A1 * | 8/2003 | Clarke | F16B 21/086 |
| | | | | 24/297 |
| 2004/0016088 | A1 * | 1/2004 | Angellotti | F16B 5/065 |
| | | | | 24/297 |
| 2006/0242802 | A1 * | 11/2006 | Scroggie | F16B 5/0657 |
| | | | | 24/297 |
| 2008/0260454 | A1 * | 10/2008 | Girodo | F16B 21/16 |
| | | | | 403/11 |
| 2015/0337882 | A1 * | 11/2015 | Iwahara | F16B 5/0664 |
| | | | | 24/489 |
| 2016/0068118 | A1 * | 3/2016 | Benedetti | F16B 5/0657 |
| | | | | 24/458 |
| 2016/0288733 | A1 * | 10/2016 | Akazawa | F16B 2/22 |
| 2016/0368433 | A1 * | 12/2016 | Vega Velazquez | F16B 13/04 |

(Continued)

*Primary Examiner* — Jason W San
(74) *Attorney, Agent, or Firm* — Quarles & Brady LLP

(57) ABSTRACT

A clip for a fastener assembly includes a main body and a base that includes a pair of fingers that each have a nub. The fingers extend from opposing ends of the base and the nubs are centrally disposed between the opposing ends.

19 Claims, 12 Drawing Sheets

(56) References Cited

U.S. PATENT DOCUMENTS

| | | | | |
|---|---|---|---|---|
| 2017/0127867 A1* | 5/2017 | Malott | .................... | A47G 29/00 |
| 2017/0129421 A1* | 5/2017 | Dickinson | ............. | F16B 21/075 |
| 2017/0182949 A1* | 6/2017 | Kato | ........................ | B60R 7/02 |
| 2017/0268550 A1* | 9/2017 | Michelini | ................ | A01K 1/00 |
| 2019/0107140 A1* | 4/2019 | Satoi | .................... | F16B 37/044 |
| 2019/0111858 A1* | 4/2019 | Xiong | .................. | F16B 21/086 |
| 2020/0049186 A1* | 2/2020 | Ai | ........................ | F16B 21/086 |
| 2020/0400180 A1* | 12/2020 | Steltz | .................... | F16B 5/0621 |
| 2021/0347313 A1* | 11/2021 | Marquez Costa | ........ | F16B 2/22 |
| 2021/0348635 A1* | 11/2021 | Lepper | ................ | F16B 19/1036 |
| 2022/0099119 A1* | 3/2022 | Dickinson | ............. | F16B 5/0657 |
| 2022/0299062 A1* | 9/2022 | Kempf | ................. | F16B 5/0685 |
| 2022/0332261 A1* | 10/2022 | Zou | ..................... | B60R 13/0206 |
| 2022/0333626 A1* | 10/2022 | Kiyota | ................. | F16B 21/086 |

\* cited by examiner

FASTENER ASSEMBLY

RELATED APPLICATIONS

This application relates to and claims priority benefits from U.S. Provisional Patent Application No. 63/157,307 entitled "Floating Clip with Home Position," filed Mar. 5, 2021, which is hereby incorporated by reference in its entirety.

BACKGROUND

Field of Embodiments of the Disclosure

The present disclosure relates to fastener assemblies. More specifically, a fastener assembly is disclosed with a clip that is configured to float while remaining assembled to a doghouse panel.

Description of the Background of the Disclosure

In the field of manufacturing, fastener assemblies are widely used for assembling components. Fastener assemblies can be used to secure a first component to a second component. In some instances, alignment of the first and second component can be difficult due to space constraints, dimensional tolerances, quantities of fasteners required, and other factors. Also, often the first and second components are formed of different materials, such as, e.g., the first component may be made of plastic and the second component may be made of metal. In use, the first component and the second component may react differently to changes in temperature. For example, when exposed to changes in temperature, the first component and the second component may expand and contract differently from one another.

There is a desire for fastener assemblies that address any of the aspects described above.

SUMMARY

In one aspect, a clip for a fastener assembly includes a main body and a base that includes a pair of fingers that each have a nub. The fingers extend from opposing ends of the base and the nubs are centrally disposed between the opposing ends.

In some embodiments, the base includes a gap that is defined between a top flange and a bottom flange. Further, the base includes a stem that extends between the top flange and the bottom flange, wherein the stem is surrounded by the gap. In some embodiments, the nubs protrude from a tip of each finger. In some embodiments, the nubs are spaced apart a first distance and a receptacle in which the base is configured to be received defines a second distance, wherein the first distance is greater than the second distance. In one embodiment, the base defines a central passage through which the main body of the clip is configured to translate. At least one of the fingers extends from a front end of the base toward a rear end of the base. In some embodiments, the clip is monolithically formed of a plastic material.

In another aspect, a fastener assembly includes a clip that has a base and a doghouse panel. The doghouse panel includes a floor that has a receptacle located between a pair of apertures. Further, the base of the clip is configured to be received within the receptacle and engaged with the pair of apertures.

In some embodiments, the apertures of the doghouse panel are spaced apart a first distance and the receptacle defines a second distance that is less than the first distance. Further, the base includes a pair of fingers that each include a nub, wherein the nubs are spaced apart a third distance that is substantially equal to the first distance. In addition, the clip defines a longitudinal axis and the nubs are disposed equidistant from the longitudinal axis. In some embodiments, the base includes a stem that extends between a top flange and a bottom flange, wherein a gap surrounds the stem. In one embodiment, when the clip and the doghouse panel are assembled, a portion of the floor of the doghouse panel is received within the stem.

In yet another aspect, a fastener assembly includes a clip that includes a main body and a base. The base has a top flange and a bottom flange that are connected by a stem that is centrally disposed between a medial side and a lateral side of the base. Further, a first finger extends from the top flange on the medial side. The fastener assembly further includes a doghouse panel that includes a receptacle in which the base of the clip is configured to be received.

In some embodiments, the clip defines a longitudinal axis that is centrally disposed between the medial side and the lateral side of the base. Further, the first finger is diametrically opposed to a second finger relative to the longitudinal axis.

In some embodiments, when the clip is assembled with the doghouse panel, the bottom flange and the top flange of the base are configured to be disposed on opposing sides of a floor of the doghouse panel and the stem of the base is configured to be received within the receptacle. Further, the first finger is configured to engage an aperture that is formed in the floor of the doghouse panel to secure the base to the doghouse panel in a locked position. In addition, the base and the doghouse panel are configured to move relative to one another while remaining assembled together. Moreover, a component is configured to be secured to the fastener assembly by engagement with the main body of the clip, wherein the component is made of a different material than at least one of the clip or the doghouse panel.

DESCRIPTION OF THE DRAWINGS

The present disclosure will be better understood and features, aspects, and advantages other than those set forth above will become apparent when consideration is given to the following detailed description thereof. Such detailed description makes reference to the following drawings.

Figure 1:
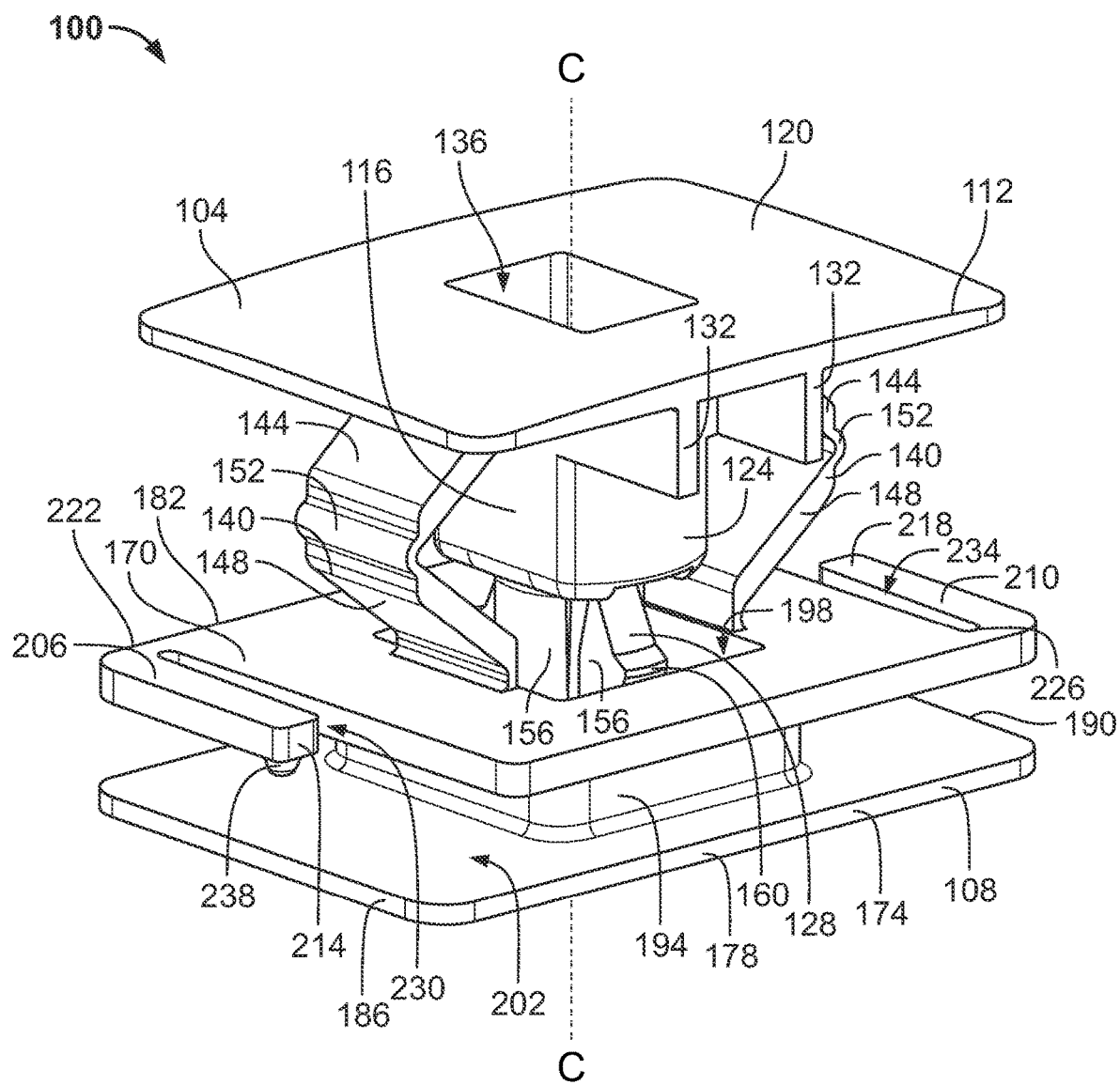
FIG. 1 is an isometric view of a clip for a fastener assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof are meant to encompass the items listed thereafter and equivalents thereof as well as additional items and equivalents thereof.

DETAILED DESCRIPTION

Certain embodiments of the present disclosure provide a fastener assembly that may be configured to engage and secure multiple components together, e.g., a first component and a second component. Various embodiments also provide a fastener assembly configured to engage and secure components of dissimilar materials, as well as to provide assistance with alignment during assembly.

The term "about," as used herein, refers to variation in the numerical quantity that may occur, for example, through typical measuring and manufacturing procedures for embodiments of the disclosure herein. Throughout the disclosure, the terms "about" refer to a range of values ±5% of the numeric value that the term precedes. While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Referring to FIG. 1, a clip 100 includes a main body 104 and a base 108, and the clip 100 defines a longitudinal axis C that extends centrally through the main body 104 and the base 108. The main body 104 of the clip 100 includes a head 112 and a shaft 116 that extends from the head 112 coaxial with the longitudinal axis C. In the illustrated embodiment, the head 112 is generally rectangular-shaped and presents a contact surface 120 that is configured to be pressed by a user, but the head 112 can be of any suitable shape. The shaft 116 includes an upper portion 124 that extends directly from the head 112 and a lower portion 128 that extends outwardly and away from the upper portion 124. That is, the upper portion 124 extends between the lower portion 128 and the head 112. Further, braces 132 extend from the upper portion 124 along the head 112 to provide reinforcement and, also, to serve as a restraint that contacts the base 108 when the main body 104 is pressed down by a user pushing on the contact surface 120 of the head 112. As such, the braces 132 extend between about 2.0 mm and about 6.0 mm below the head 112. Preferably, the braces 132 extend between about 3.0 mm and about 5.0 mm below the head. In one embodiment, the braces 132 extend between about 4.0 mm below the head 112. In some embodiments, the main body 104 is monolithically formed of a plastic material, such as, e.g., polyamide or nylon 6/6.

In the illustrated embodiment, the main body 104 includes a channel 136 that extends through the head 112 and the shaft 116. The channel 136 is centrally disposed in the head 112 and is formed within the upper portion 124 and the lower portion of the shaft 116. The clip 100 further includes a pair of arms 140 that extend between the main body 104 and a top flange 170 of the base 108, as will be described below. In particular, the arms 140 connect the head 112 and the base 108 together and the arms 140 are pre-disposed in a rotated V-shaped position while at rest, although other configurations are possible. The clip 100 may have more than two arms or, alternatively, the clip 100 may have only a single arm. In the illustrated embodiment, each of the arms 140 comprises an upper segment 144 and a lower segment 148 that are connected by a hinge 152, which is provided as a living hinge that is monolithically formed with the upper and lower segments 144, 148, to allow for flexure about the hinge 152. When the main body 104 is pressed down by a user, the arms 140 flex about the hinge 152 so that the upper segment 144 and the lower segment 148 are brought closer toward one another. The lower portion 128 of the shaft 116 includes legs 156 that are disposed below the upper portion 124 and diametrically opposed to one another relative to the longitudinal axis C. Each of the legs 156 has a rim 160 that is the outwardmost point, i.e., farthest from the longitudinal axis C, of each leg 156 and is located at the widest part of each leg 156. The legs 156 are spaced apart from one another by the channel 136 that is formed within the lower portion 128 of the shaft 116. Additionally, the legs 156 both terminate at a foot 164 (see FIG. 3) of the shaft 116.

With continued reference to FIG. 1, the base 108 of the clip 100 includes a top flange 170 and a bottom flange 174. The top flange 170 and the bottom flange 174 both extend between a front end 178 and a rear end 182 of the base 108 and, also, between a medial side 186 and a lateral side 190 of the base 108. It will be appreciated that the front end 178 and the rear end 182 are opposite one another, and that the medial side 186 and the lateral side 190 are opposite one another. Further, the front end 178, rear end 182, medial side 186, and lateral side 190, as used herein, refer to regions or areas of the base 108, as well as indicating regions or areas of the clip 100 generally. A hollow stem 194 connects the top flange 170 to the bottom flange 174. A central passage 198 extends through the top flange 170, the stem 194, and the bottom flange 174 and is coaxial with the longitudinal axis C. A gap 202 is formed between the top flange 170 and the bottom flange 174 and the gap 202 surrounds the stem 194. To that end, the gap 202 extends outwardly from the stem 194 to the front end 178, rear end 182, lateral side 190, and medial side 186 of the base 108. The gap 202 is generally uniform in height H between the top flange 170 and the bottom flange 174, although other configurations are possible. In the illustrated embodiment, the top flange 170 and the bottom flange 174 are each generally rectangular-shaped but any other suitable shape may be utilized. In some embodiments, the base 108 is monolithically formed of a plastic material, such as, e.g., polyamide or nylon 6/6.

Referring to FIG. 1, locking features are provided on the base 108 in the form of flex fingers 206, 210 that are disposed on the medial side 186 and the lateral side 190, respectively, of the top flange 170 of the base 108. In particular, the flex finger 206 on the medial side 186 extends from the rear end 182 toward the front end 178 to a tip 214 positioned a distance about halfway between rear end 182 and front end 178 of the base 108. The flex finger 210 on the lateral side 190 extends from the front end 178 toward the rear end 182 to a tip 218 positioned a distance about halfway between the front end 178 and the rear end 182 of the base 108. Accordingly, in the present embodiment, the flex fingers 206, 210 are diametrically opposed relative to the longitudinal axis C and identical to one another in size, although other configurations are possible. The flex fingers 206, 210 are provided in the form of relatively thin, rectangular extensions that are coplanar with the top flange 170 and coextensive with the medial side 186 and the lateral side, respectively, of the bottom flange 174 (see FIG. 2). The flex finger 206 on the medial side 186 is connected to the rear end 182 and medial side 186 of the top flange 170 by a medial bridge 222, and the flex finger 210 on the lateral side 190 is connected to the front end 178 and lateral side 190 of the top flange 170 by a lateral bridge 226. The locations of the flex fingers 206, 210 provide stability to the overall fastener, but other configurations are possible.

Further, a medial gap 230 is formed between the flex finger 206 and the medial side 186 of the top flange 170, as well as extending from the medial bridge 222 to the tip 214 of the flex finger 206. A lateral gap 234 is formed between the flex finger 210 and the lateral side 190 of the top flange 170, as well as extending from the lateral bridge 226 to the tip 218 of the flex finger 210. The medial and lateral bridges 222, 226 are each thin elements connecting the flex fingers 206, 210 to the top flange 170. Further, the flex fingers 206, 210 each include a nub 238, 242 that is disposed at the respective tip 214, 218 (see FIG. 2). The nubs 238, 242 are provided in the form of conical or semi-conical protrusions that extend downwardly from the flex fingers 206, 210, respectively. Thus, the nubs 238, 242 extend toward the bottom flange 174 and into the gap 202.

Figure 2:
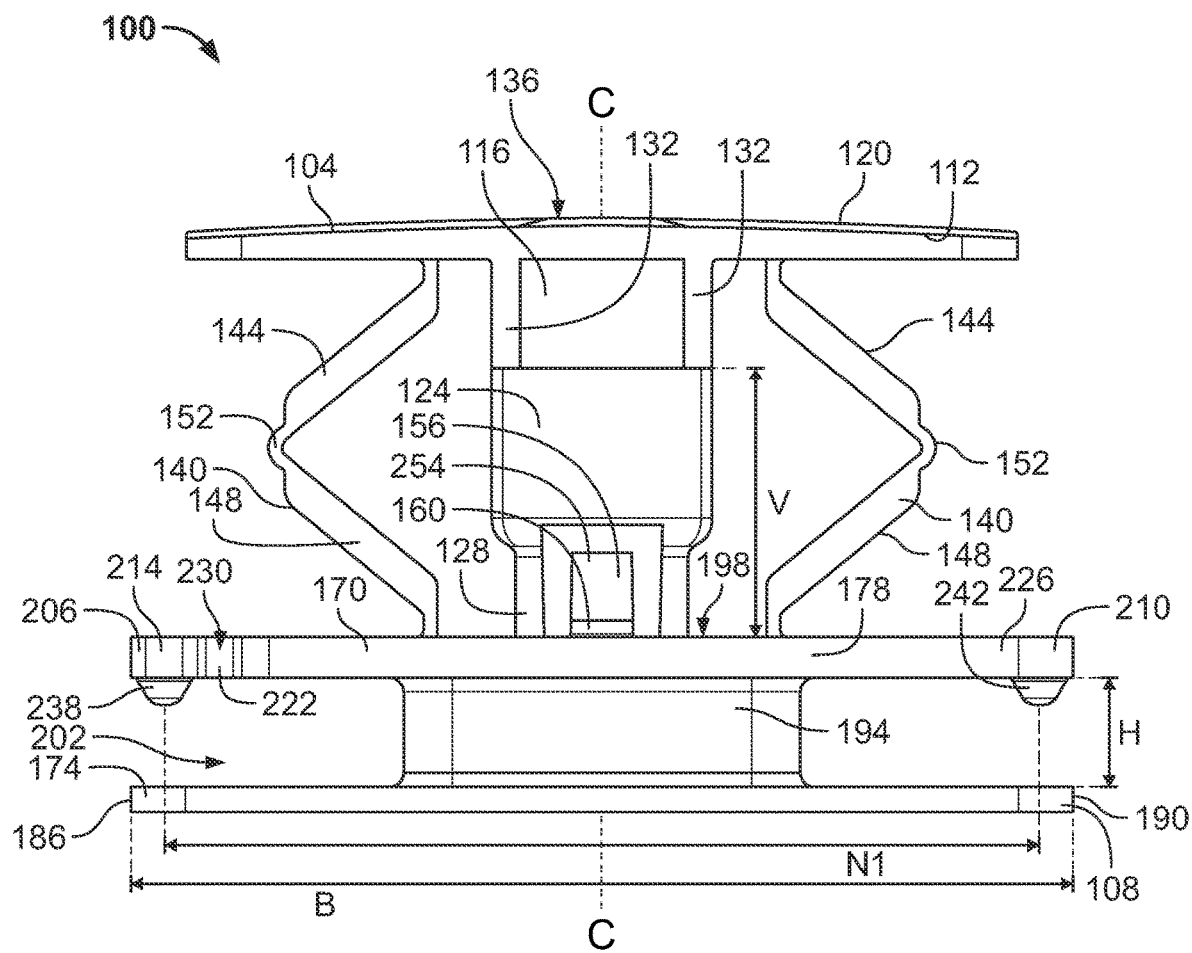
FIG. 2 is a front elevational view of the clip of FIG. 1.

With reference to FIG. 2, which is a front elevational view of the clip 100, the uniform height H of the gap 202 between the top flange 170 and the bottom flange 174 is visible. That is, with exception to the nubs 238, 242, the height H of the gap 202 is consistent between the front end 178 and rear end 182 and between the lateral side 190 and medial side 186. In some embodiments, the height H is between about 2.0 mm and about 6.0 mm and, preferably, the height H is between about 3.0 mm and about 5.0 mm. More preferably, the height H is between about 3.5 mm and about 4.5 mm. In one embodiment, the height H is about 4.0 mm. In some embodiments, the height H of the gap 202 may vary between the front end 178 and the rear end 182 or between the lateral side 190 and the medial side 186, or some combination thereof. Additionally, FIG. 2 depicts a distance N1 between the nubs 238, 242. In some embodiments, the distance N1 is between about 25 mm and about 40 mm and, preferably, the distance N is between about 28 mm and about 38 mm. More preferably, the distance N1 is between about 30 mm and about 35 mm. In the illustrated embodiment, the nubs 238, 242 are positioned equidistant from the longitudinal axis C, and the longitudinal axis C is located approximately half of the distance N1 from each of the nubs 238, 242. In some embodiments, the nubs 238, 242 can be located different distances from one another relative to the longitudinal axis C. Further, the nubs 238, 242 are generally rounded, conical or semi-conical protrusions, but the nubs 238, 242 may be provided in different sizes and shapes. In the embodiment illustrated, the nubs 238, 242 protrude about 1.0 mm downwardly from the flex finger 206, 210, respectively. Also, the bottom flange 174 has a dimension B between the lateral side 190 and the medial side 186 of the base 108. The dimension B of the base 108 is between about 30 mm and about 40 mm and, preferably, the dimension B is between about 32 mm and about 36 mm. In one embodiment, the dimension B is about 34.4 mm.

It will be appreciated that the main body 104 is positioned in a detached configuration where the braces 132 of the main body 104 are located a vertical distance V from the top flange 170. In some embodiments, the vertical distance V is between about 6 mm and about 18 mm and, preferably, the vertical distance V is between about 8 mm and about 16 mm. More preferably, the vertical distance V is between about 9 mm and about 14 mm. When a user presses down on the contact surface 120 of the head 112 of the main body 104, the shaft 116 is translated linearly downwardly through the central passage 198 of the base and along the longitudinal axis C so that the braces 132 are moved toward the top flange 170 of the base 108. When the main body 104 is translated downwardly to a position where braces 132 contact the top flange 170 of the base 108, such that the vertical distance V is reduced to zero, the main body 104 is positioned in an attached configuration.

Figure 3:
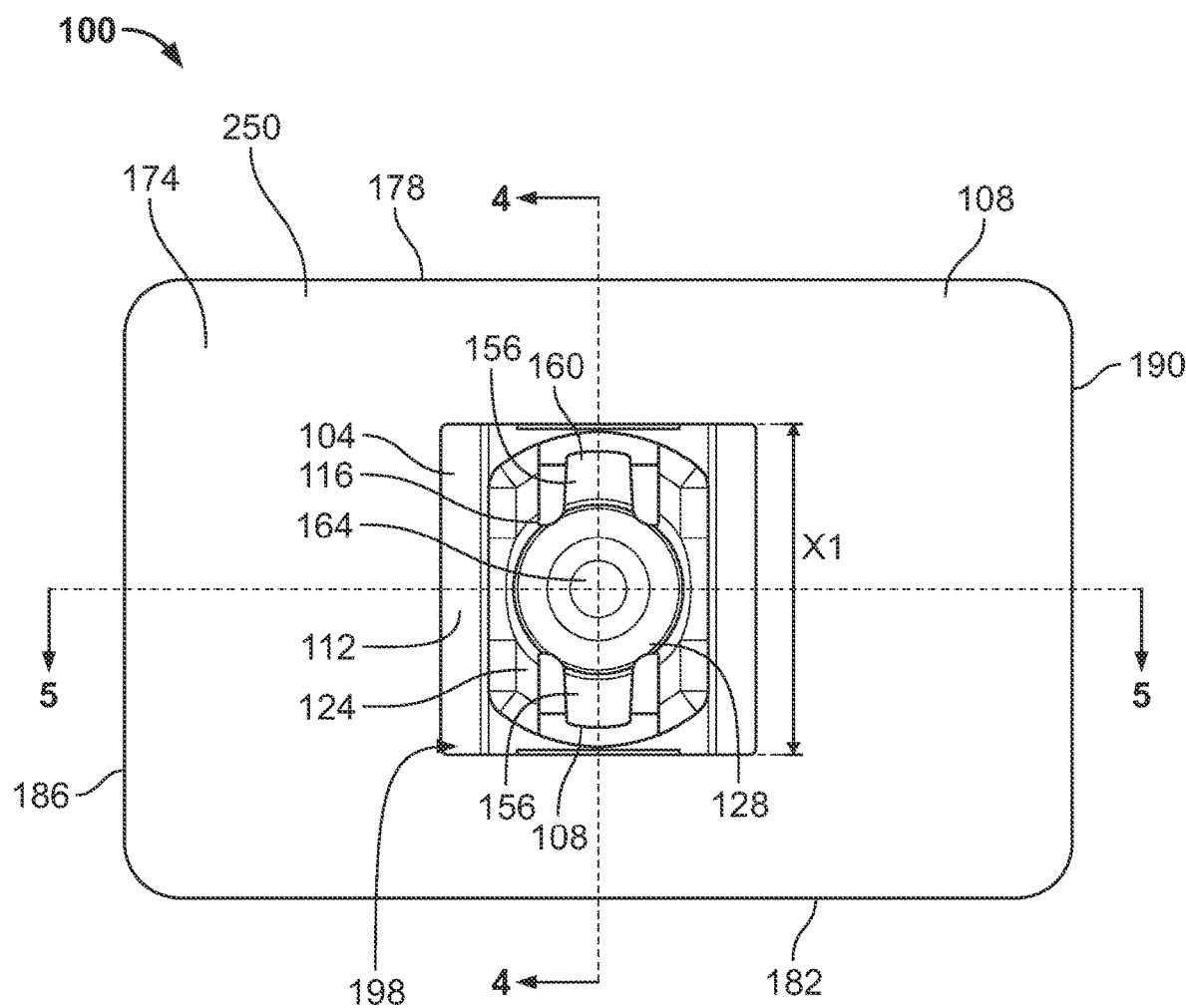
FIG. 3 is a bottom view of the clip of FIG. 1.

Referring to FIG. 3, the bottom flange 174 has a bottom surface 250 through which the central passage 198 is exposed and is centrally disposed. The central passage 198 is generally rectangular shaped and sized to allow the shaft 116 to translate therethrough. In particular, the central passage 198 of the base 108 has a front-to-rear dimension X1 that is sized to allow each leg 156 to translate therethrough without compressing or displacing the legs 156 inwardly toward one another. In some embodiments, the dimension X1 is between about 6 mm and about 18 mm and, preferably, the dimension X1 is between about 8 mm and about 12 mm. In one embodiment, the X1 dimension is about 10 mm. In some embodiments, the central passage 198 may be sized and shaped differently to cause the legs 156 to be compressed inwardly and/or to provide frictional engagement with the rim 160 of each leg 156, such as, e.g., to cause an audible clicking or haptic sensation as the main body 104 is translated through the base 108 from the detached configuration to the attached configuration. Additionally, FIG. 3 depicts the main body 104 of the clip 100 in the detached configuration and, thus, the foot 164 of the main body 104 is positioned within the central passage 198. It will be appreciated that when the main body 104 is translated to the attached configuration, the foot 164 also translates downwardly through the central passage 198 and away from the bottom surface 250 of the bottom flange 174.

Figure 4:
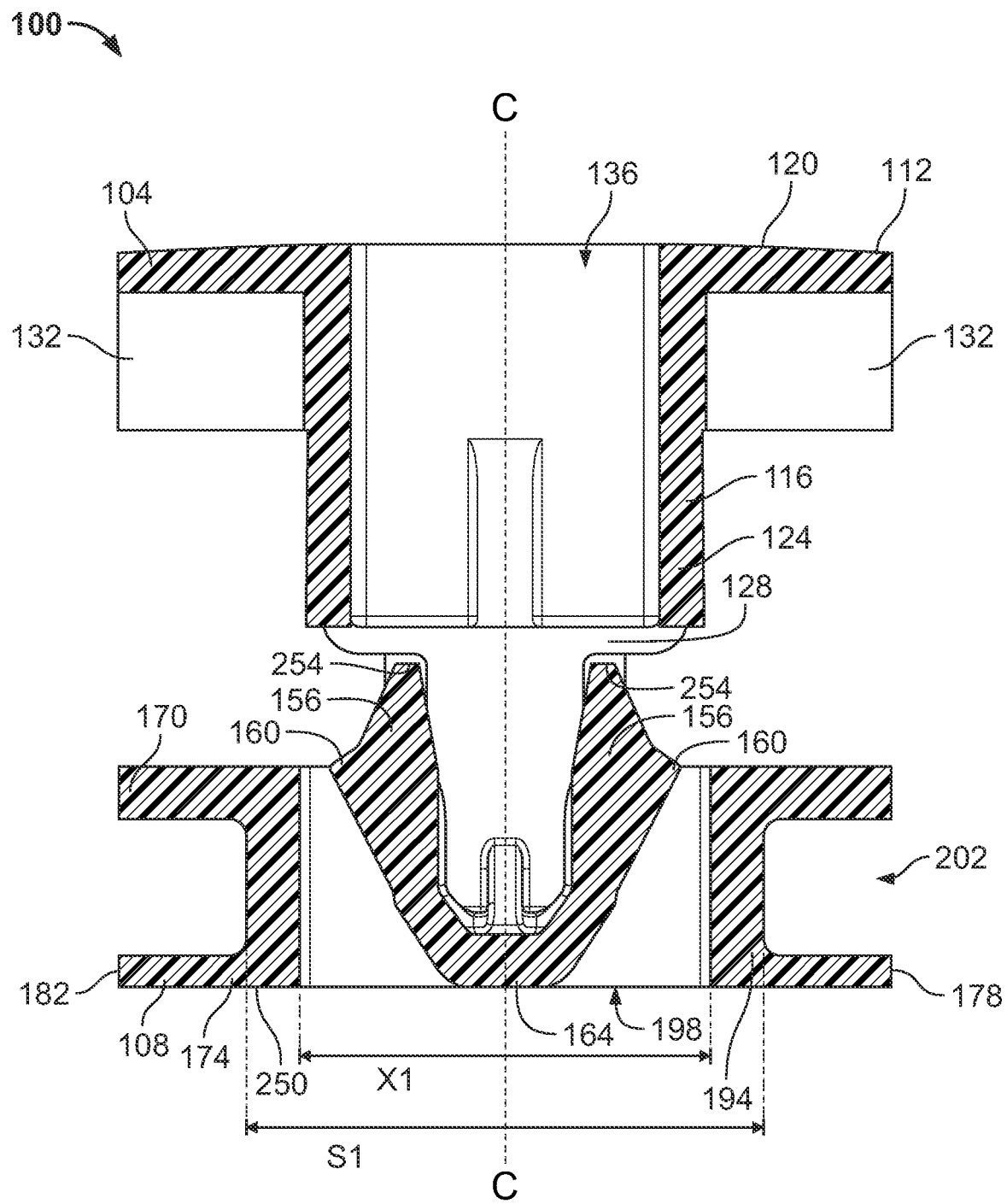
FIG. 4 is a sectional view of the clip taken along the line 4-4 of FIG. 3.
Figure 5:
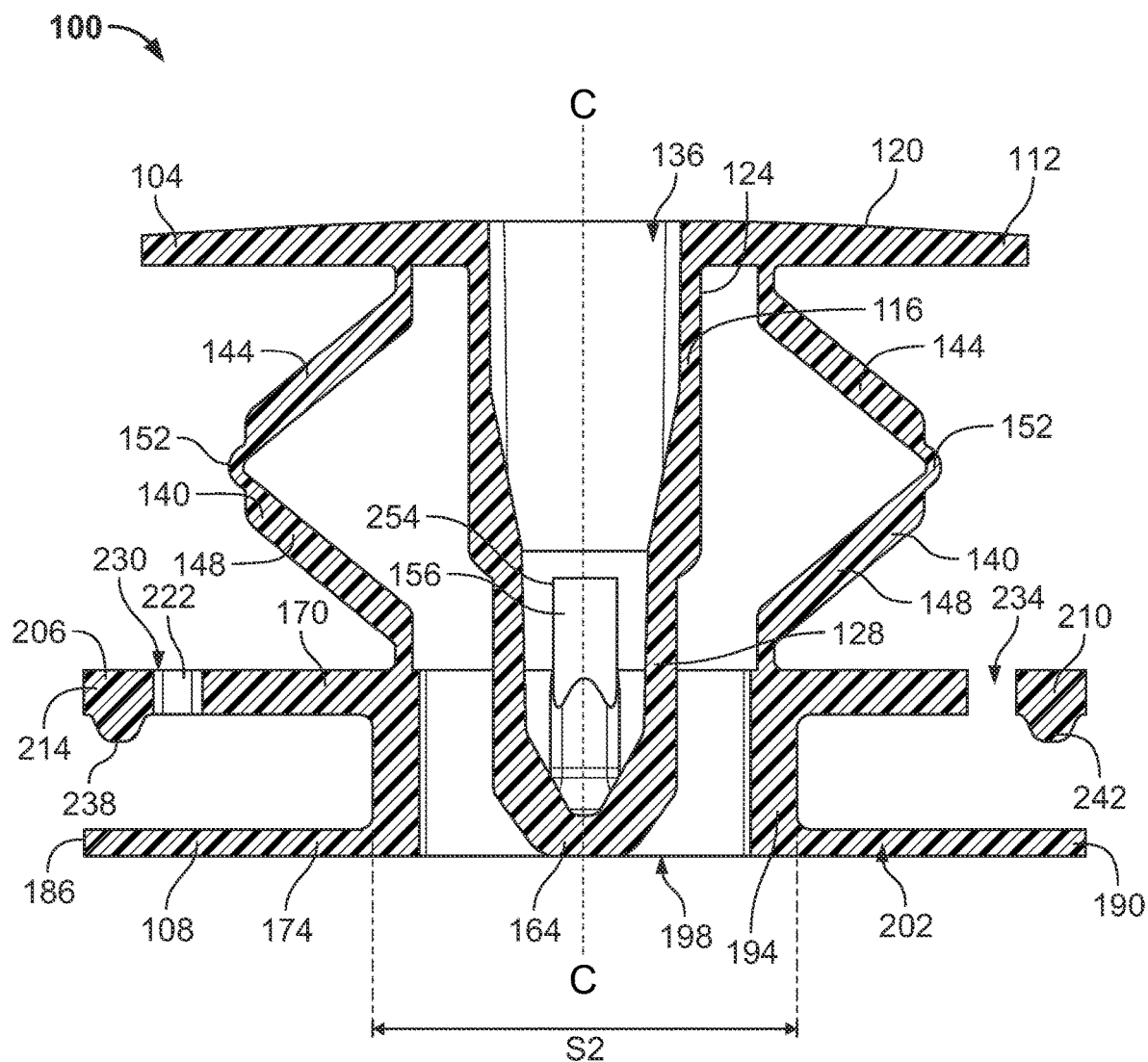
FIG. 5 is a sectional view of the clip taken along the line 5-5 of FIG. 3.

With reference to FIG. 4, the stem 194 has a front-to-rear dimension S1 that is between about 11 mm and about 22 mm. Preferably, the dimension S1 of the stem 194 is between about 13 mm and about 20 mm. In one embodiment, the dimension S1 of the stem 194 is about 15 mm. With reference to FIG. 5, the stem 194 has a lateral-to-medial dimension S2 that is between about 10 mm and about 20 mm. Preferably, the dimension S2 of the stem 194 is between about 12 mm and about 18 mm. In one embodiment, the dimension S2 of the stem 194 is about 14.5 mm. Accordingly, in one embodiment, the front-to-rear dimension S1 of the stem 194 is greater than the lateral-to-medial dimension S2, although other configurations are possible. Further, the dimension X1 is smaller than the dimension S1 of the stem 194 in the illustrated embodiment, although other configurations are possible. For example, with reference to FIG. 4, the central passage 198 may flare outwardly and/or include beveled or chamfered edges, such that the dimension X1 varies therealong and, near the bottom surface 250 of the bottom flange 174 of the base 108, the dimension X1 may increase to be equal to or greater than the dimension S1 of the stem 194. Additionally, the top flange 170 is thicker than the bottom flange 174, although other configurations are possible.

Referring to FIGS. 4 and 5, the channel 136 narrows or tapers from the head 112 toward the foot 164 of the main body 104. Turning to FIG. 4, the legs 156 each have a free end 254 at an uppermost point that is opposite the foot 164 and capable of displacement inwardly and outwardly relative to the longitudinal axis C. That is, the legs 156 are configured to bend or flex about the foot 164 so that the legs 156 are compressed toward one another and inwardly relative to the longitudinal axis C, which causes the free ends 254 of the legs 156 to also be displaced toward one another and into the channel 136. In addition, the legs 156 are configured to spring back into the position illustrated in FIG. 4 after being compressed. To that end, when the legs 156 spring back outwardly relative to the longitudinal axis C and away from one another, the free ends 254 of the legs 156 are also displaced away from one another. Additionally, the rims 160 of the legs 156 are also capable of displacement inwardly and outwardly relative to the longitudinal axis C. That is, when the legs 156 are compressed inwardly toward one another relative to the longitudinal axis C, the rims 160 of the legs 156 are also displaced toward one another and into the channel 136. In addition, when the legs 156 spring back away from one another and outwardly relative to the longitudinal axis C, the rims 160 of the legs 156 are also displaced away from one another.

Figure 6:
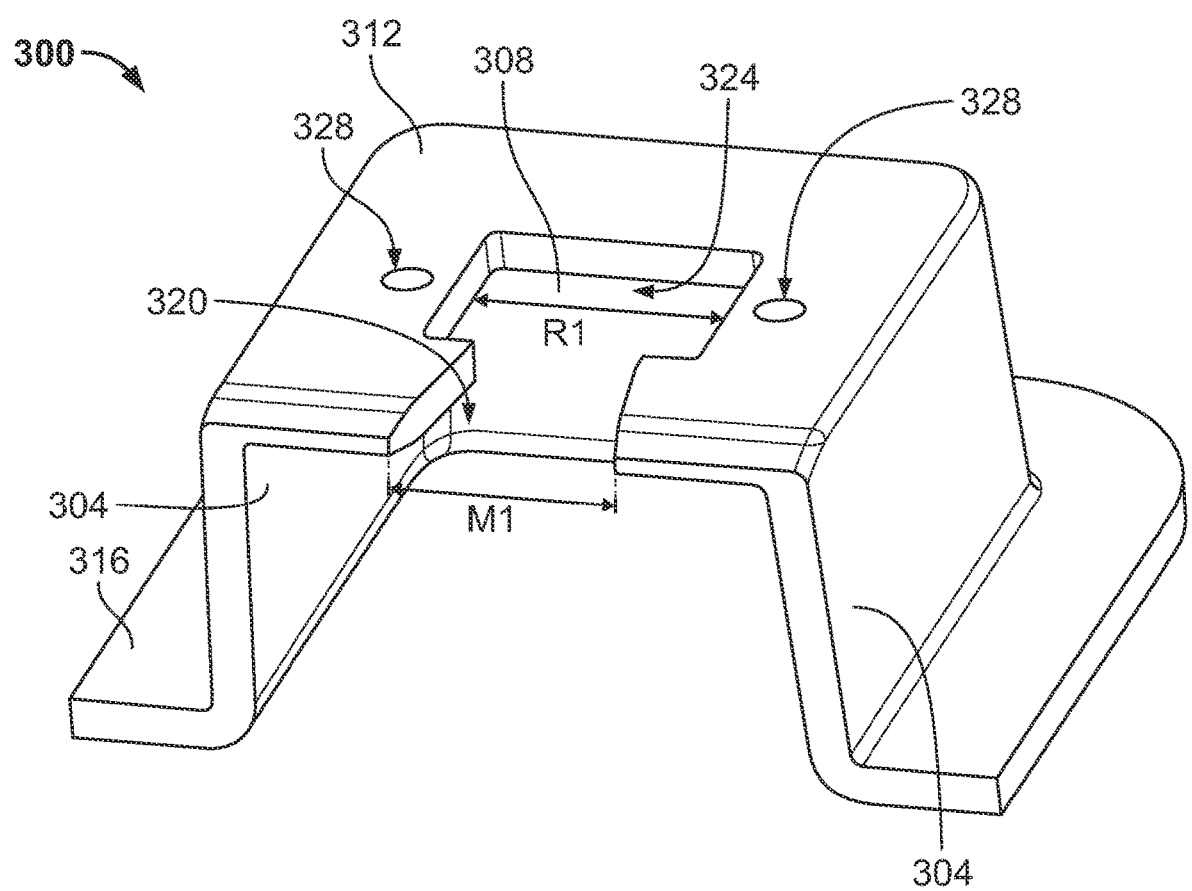
FIG. 6 is an isometric view of a doghouse panel for a fastener assembly, according to an embodiment of the present disclosure.

Turning to FIG. 6, a molding panel or doghouse panel 300 that is illustrated as having sidewalls 304 and an end wall 308 extending from a floor 312 to a peripheral flange 316. The peripheral flange 316 extends continuously along the sidewalls 304 and the end wall 308. The floor 312 includes a mouth 320 that connects to a receptacle 324. A pair of locking mounts or apertures 328 are disposed on the floor 312 and the receptacle 324 is disposed between the apertures 328. The apertures 328 are spaced apart across the receptacle 324 and equidistant from the end wall 308. In the illustrated embodiment, the floor 312 defines the mouth 320 to have a dimension M1 that narrows toward the receptacle 324. To that end, the dimension M1 of the mouth 320 varies between about 12 mm and about 30 mm. In one embodiment, the dimension M1 of the mouth 320 narrows from about 28 mm to about 14.5 mm. Further, the floor 312 defines the receptacle 324 to have a dimension R1 that is between about 18 mm and about 32 mm. Preferably, the dimension R1 of the receptacle 324 is between about 20 mm and about 30 mm. Accordingly, because the apertures 328 are arranged to correspond with the dimension N1 between the nubs 238, 242, the apertures 328 are spaced apart a distance that is greater than the dimension R1 of the receptacle 324.

It will be appreciated the dimensions M1 and R1 are configured to correspond to the dimension S2 of the stem 194 and the dimension B of the base 108 (see FIG. 2). To that end, the minimum dimension M1 is configured to correspond to the dimension S2 of the stem 194 to allow the stem 194 to be translated, e.g., via sliding, through the mouth 320 into the receptacle 324 during assembly of the clip 100 with the doghouse panel 300, as will be discussed in reference to FIG. 7. Further, the dimension B of the base 108 is configured to be greater than the dimension R1 of the receptacle 324 to prevent the bottom flange174 from translating vertically through the receptacle 324 when the clip 100 is assembled with the doghouse panel 300. In one embodiment, the dimension R1 of the receptacle R1 is about 28 mm. Further, the apertures 328 are spaced apart from one another a distance that corresponds to the distance N1 between the nubs 238, 242 of the base 108, such that the nubs 238, 242 are received in the apertures 328 when the clip 100 is assembled with the doghouse panel 300.

Figure 7:
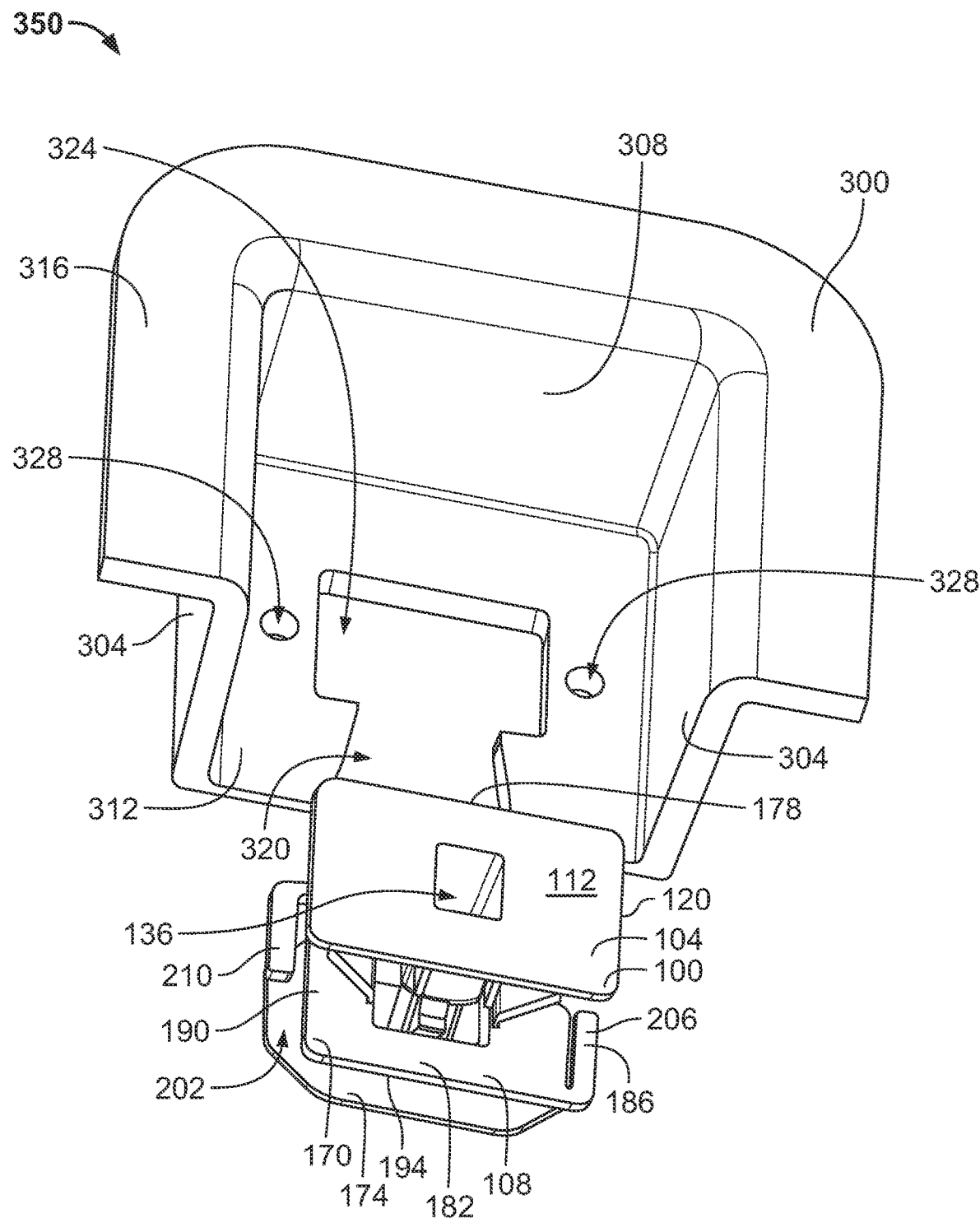
FIG. 7 is an isometric view of a pre-assembly configuration of a fastener assembly comprising the clip of FIG. 1 and the doghouse panel of FIG. 6.

Referring to FIG. 7, which illustrates a pre-assembly configuration of the fastener assembly 350, the clip 100 is brought toward the mouth 320 of the doghouse panel 300 with the front end 178 of the base 108 configured to face the doghouse panel 300. It will be appreciated that the rear end 182 of the base 108 can also be configured to face the doghouse panel 300 in this pre-assembly configuration. In either orientation, the dimension S2 of the stem 194 is aligned with the dimension M1 of the mouth 320 so that the base 108 can be translated through the mouth 320 and into the receptacle 324. Thus, the clip 100 can be assembled with the doghouse panel 300 by mere translation in one of two orientations, i.e., a front end-facing orientation or a rear end-facing orientation. In some embodiments, the minimum dimension M1 of the mouth 320 is smaller than the dimension S1 of the stem 194 of the base 108 and, thus, the clip 100 may be prevented from translating through the mouth 320 and into the receptacle 324 in a lateral side-facing orientation or a medial side-facing orientation. Accordingly, the clip 100, especially the stem 194 of the base 108, can be received within the mouth 320 when oriented with the lateral side 190, i.e., lateral side-facing, or the medial side 186, i.e., medial side-facing, facing the doghouse panel 300 and then rotating the clip 100 90 degrees about the longitudinal axis C to allow the stem 194 to fit through the mouth 320 and into the receptacle 324. Further, the gap 202 of the base 108 is aligned with the floor 312 of the doghouse panel 300, such that the bottom flange 174 is positioned below the floor 312 and the top flange 170 is positioned above the floor 312. In this way, the floor 312 of the doghouse panel 300 is configured to be aligned with and at least partially received within the gap 202 of the clip 100. That is, at least a portion of the floor 312 is configured to be received within the gap 202 of the base 108.

Figure 8:
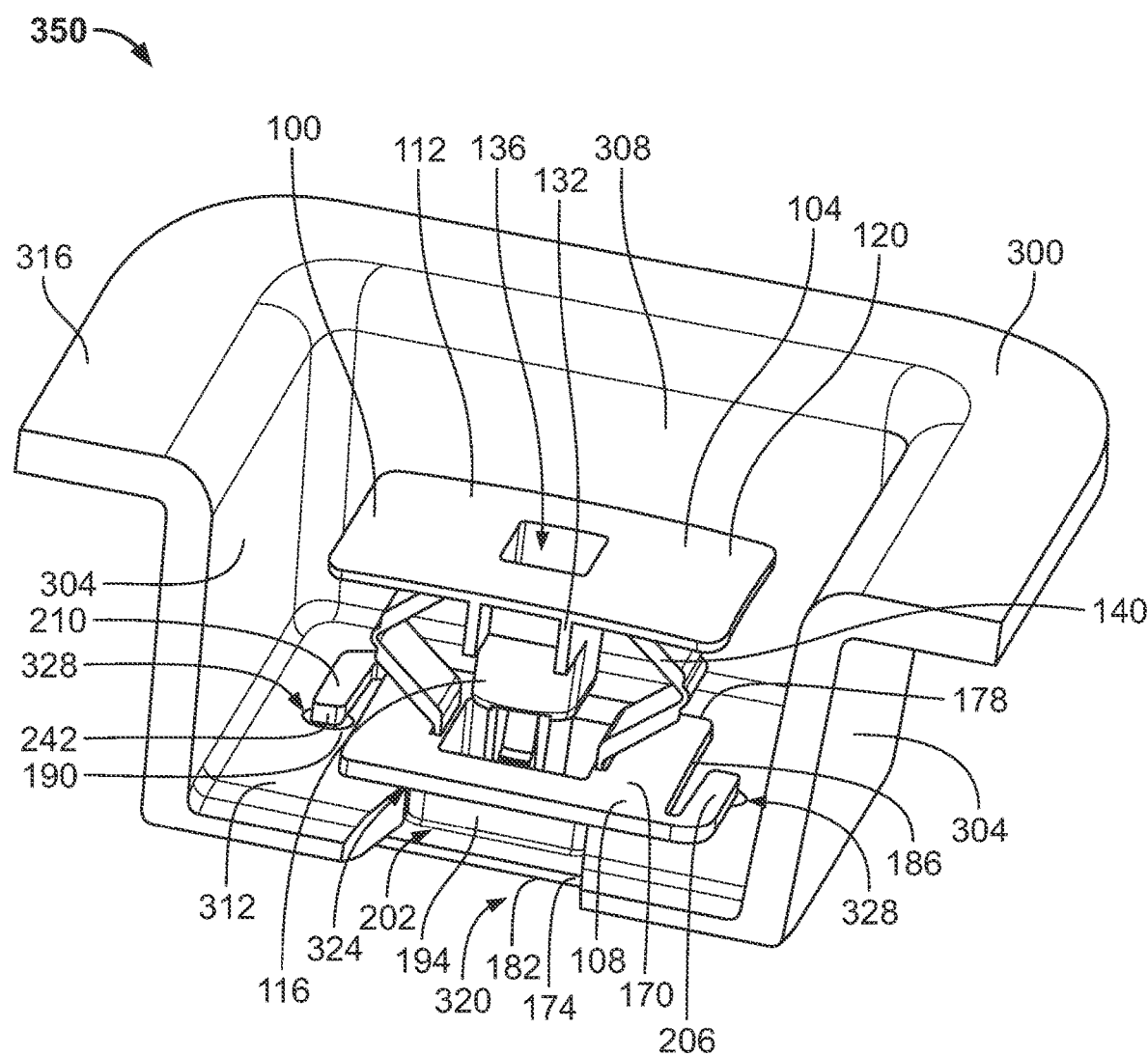
FIG. 8 is an isometric view of an assembled configuration of the fastener assembly of FIG. 7 where the clip is depicted in a locked position.
Figure 9:
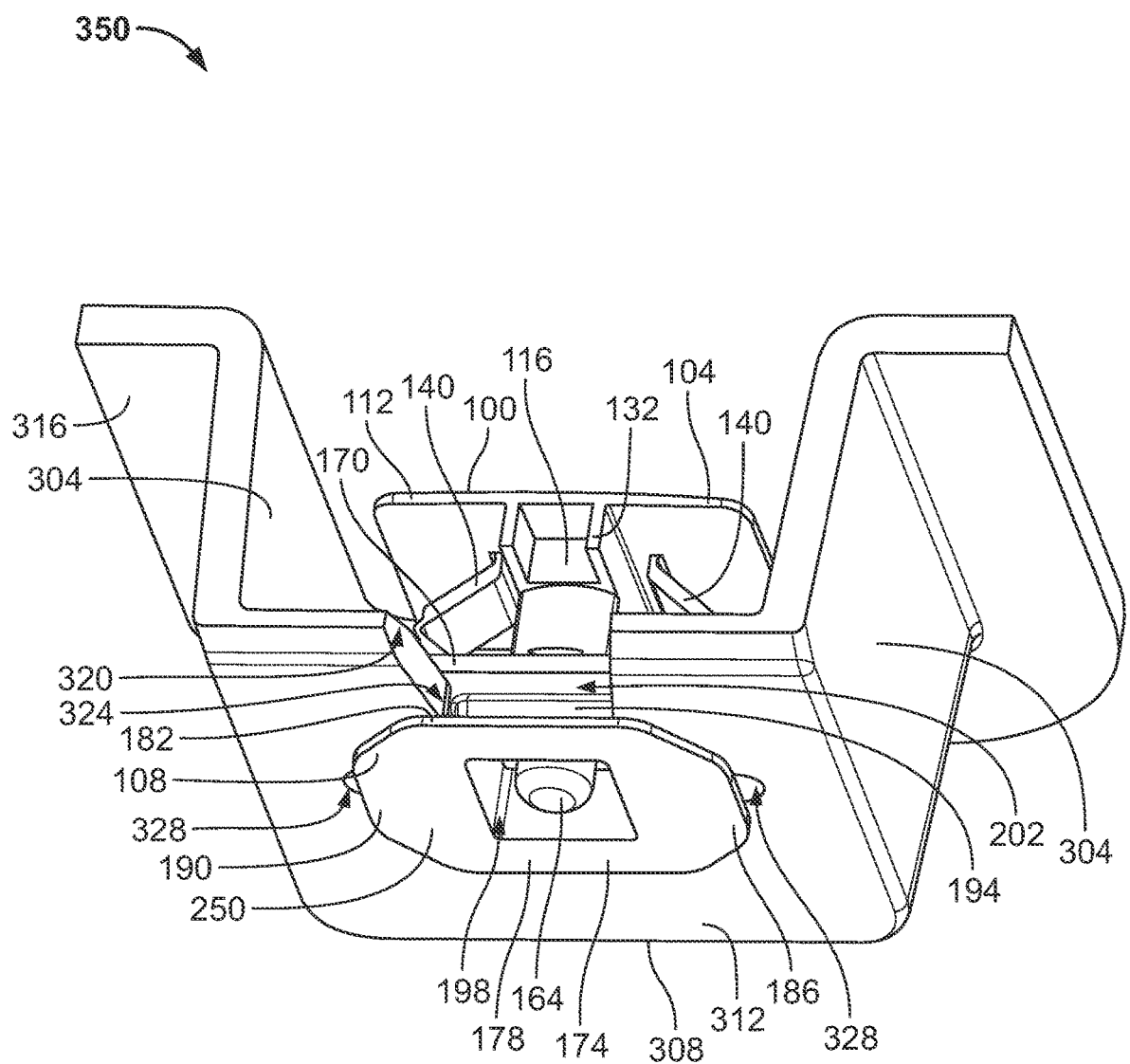
FIG. 9 is another isometric view of the fastener assembly of FIG. 8.

Turning to FIGS. 8 and 9, the fastener assembly 350 is illustrated in an assembled configuration in which the clip 100 has been assembled with the doghouse panel 300. Further, the base 108 is positioned in a locked position. To that end, the stem 194 has been translated through the mouth 320 and into the receptacle 324 of the doghouse panel 300 and the nubs 238, 242 (see FIG. 11) have been received within the apertures 328 of the floor 312 of the doghouse panel 300. Accordingly, the base 108 is secured to the doghouse panel 300 by engagement of the flex fingers 206, 210 and the respective nubs 238, 242 with the floor 312, and by engagement of the floor 312 between the top flange 170 and the bottom flange 174. Because the nubs 238, 242 are received within the apertures 328 of the floor 312, the base 108 is prevented from detachment or excessive displacement forwardly, rearwardly, and side-to-side in the locked position. It will be appreciated that the locked position may also be referred to herein as the home position. Accordingly, when the base 108 is in the locked or home position, the clip 100 is also secured against excessive displacement within the receptacle 324 and detachment from the doghouse panel 300.

Figure 10:
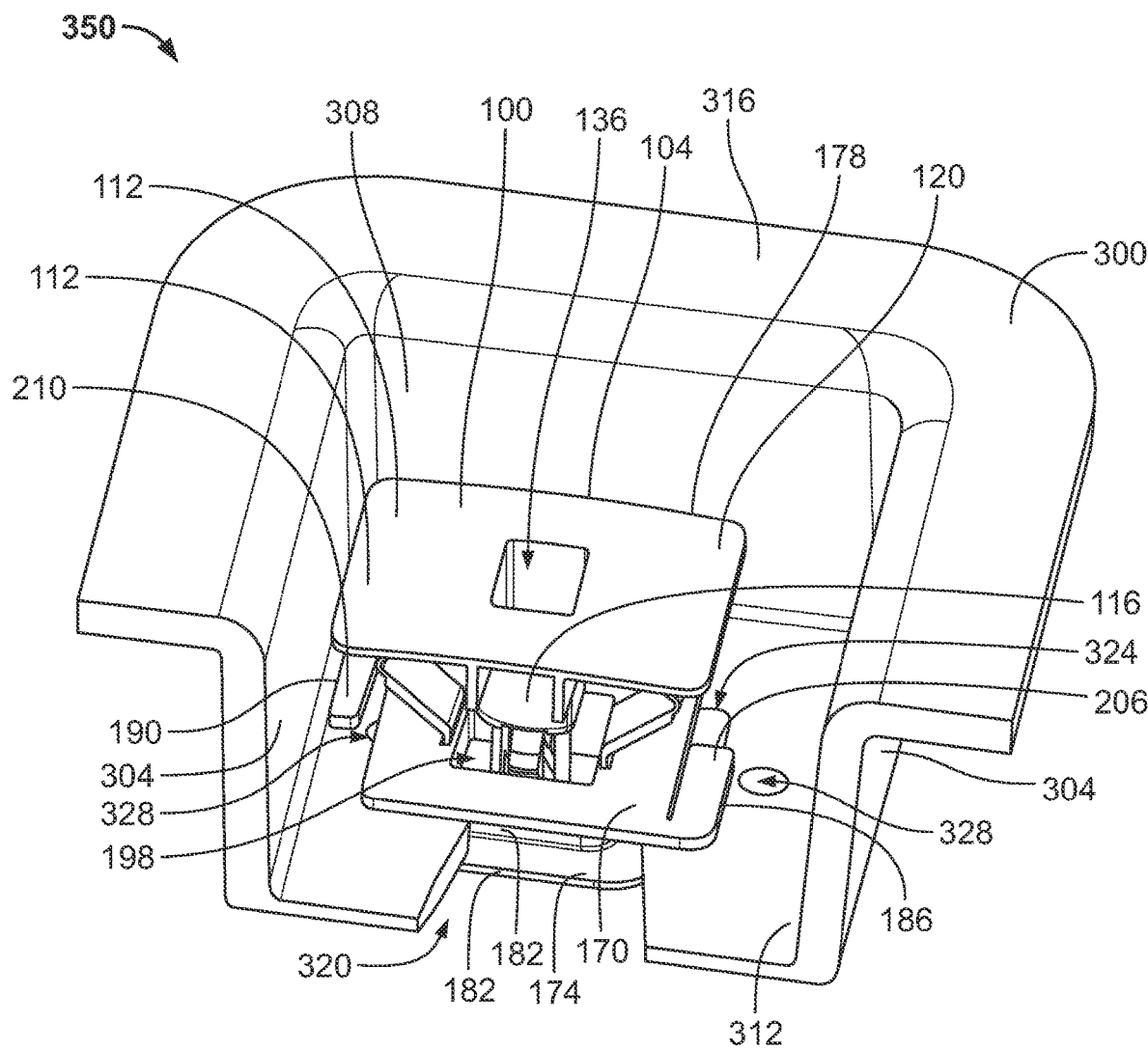
FIG. 10 is an isometric view of the fastener assembly of FIG. 7 where the clip is depicted in an unlocked position.

FIG. 10 depicts the clip 100 and the doghouse panel 300 being assembled but in an unlocked position in which the nubs 238, 242 are displaced from the apertures 328 of the floor 312 and the stem 194 of the base 108 is shifted or offset laterally within the receptacle 324 of the doghouse panel 300. As such, the nubs 238, 242 can rest against the floor 312 or be positioned within the receptacle 324, or some combination thereof. The base 108 remains secured within the receptacle 324 of the doghouse panel 300 due to the arrangement of the bottom flange 174 and the top flange 170. That is, because the bottom flange 174 is configured to have dimension B (se FIG. 2) that is greater than the dimension R1 (see FIG. 6) of the receptacle 324, and because the distance N1 (see FIG. 2) between the nubs 238, 242 is still greater than the dimension R1 (see FIG. 6) of the receptacle 324, the floor 312 of the doghouse panel 300 remains within the gap 202 of the base 108. In addition, the narrowed shape of the mouth 320 also prevents translation of the base 108 outwardly from the receptacle 324, since the stem 194 is sized with dimension S2 that corresponds to the minimum dimension M1 (see FIG. 6) of the mouth 320.

Figure 11:
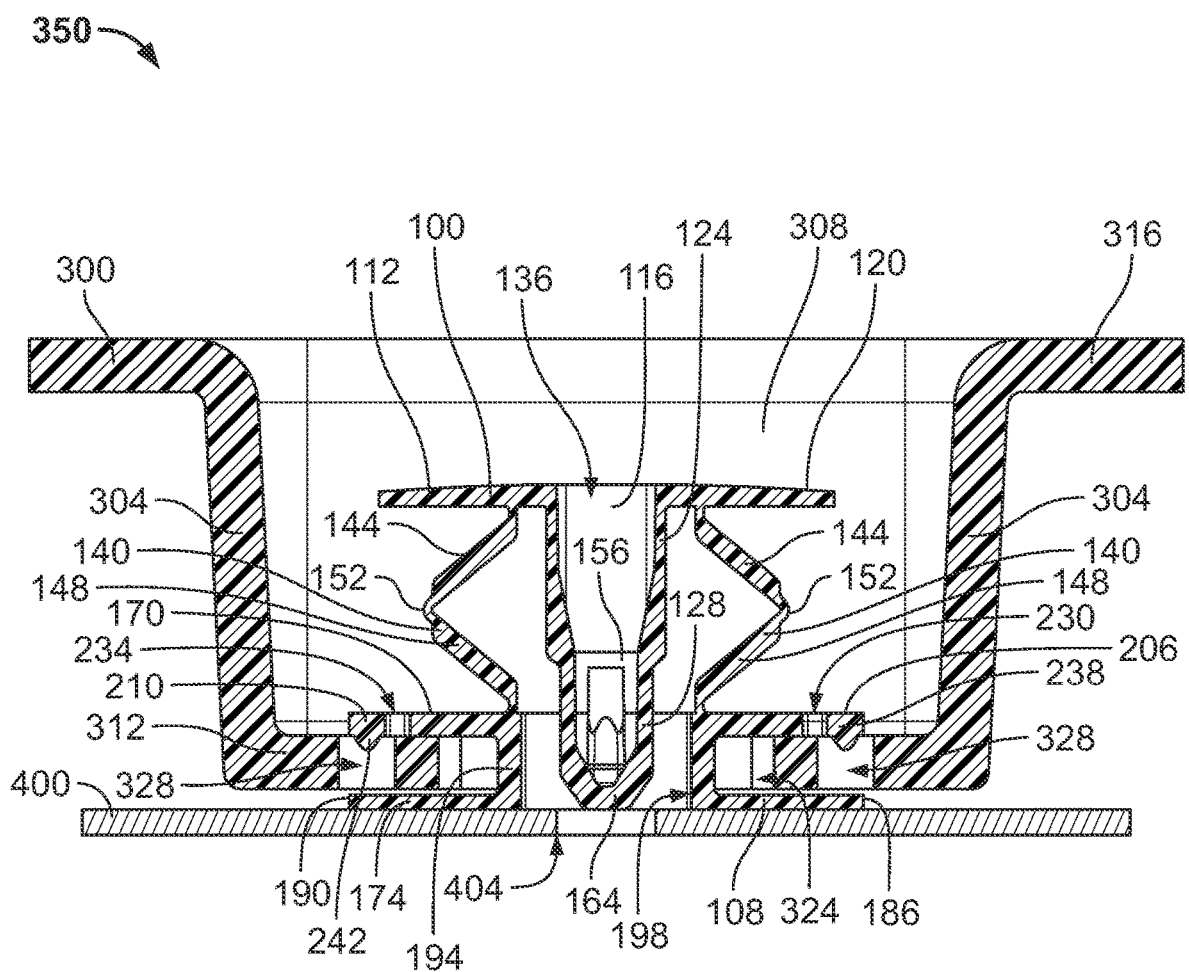
FIG. 11 is a sectional view of a fastener assembly comprising the clip of FIG. 1 and the doghouse panel of FIG. 7 and also including a component.
Figure 12:
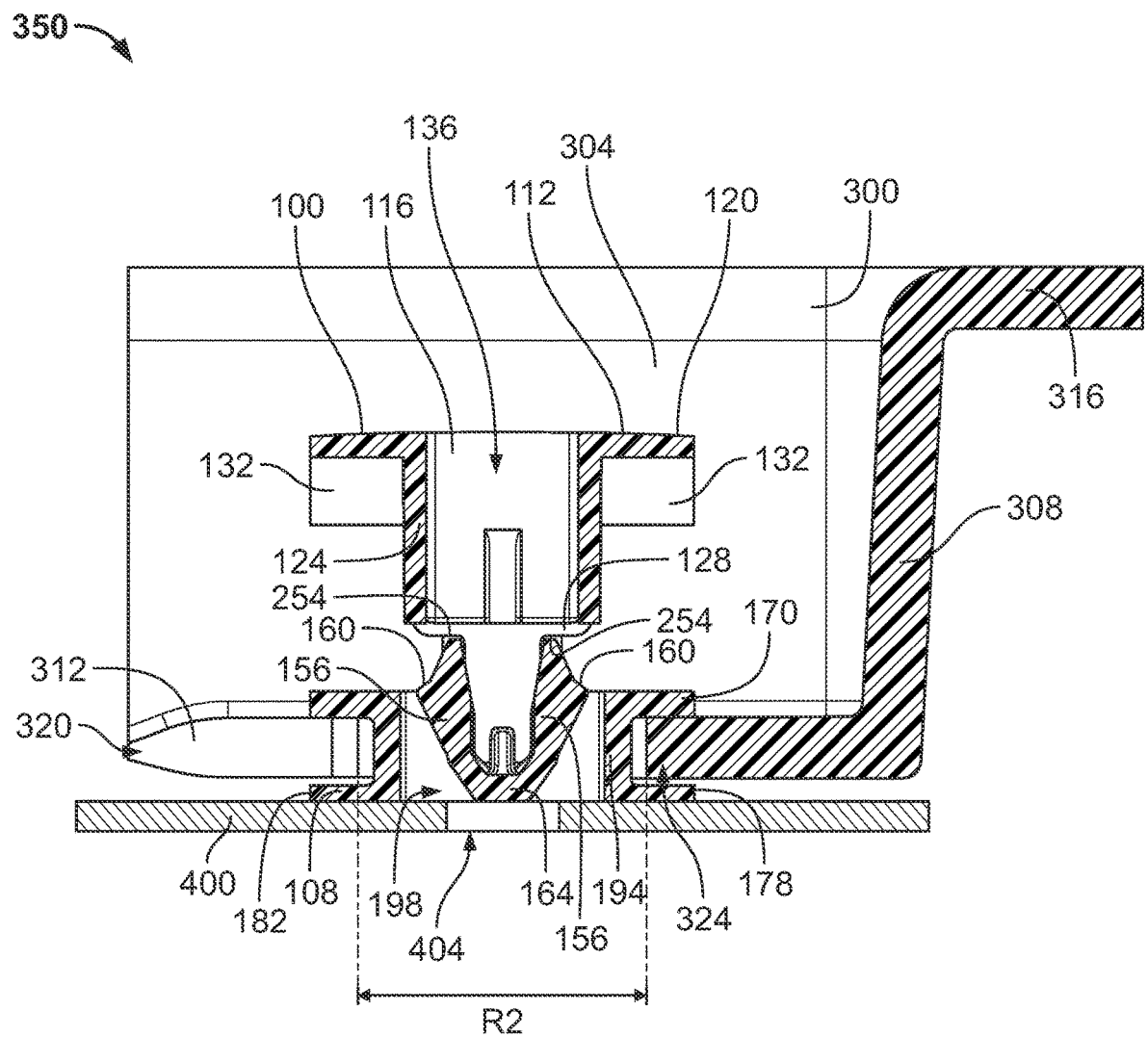
FIG. 12 is another sectional view of the fastener assembly and the component of FIG. 11.

With reference to FIGS. 10-12, the base 108 is configured to allow the clip 100 to float within the receptacle 324 after being assembled to the doghouse panel 300 and while remaining assembled to the doghouse panel 300. To that end, the stem 194 is configured to be smaller than the receptacle 324 so that the clip 100 by way of the base 108 can be moved, e.g., float, while assembled to the doghouse panel 300. To do so, the base 108 is removed from the locked configuration and placed into the unlocked configuration, as illustrated in FIG. 10, so that the flex fingers 206, 210 and the respective nubs 238, 242 are disengaged from the apertures 328. Further, as illustrated in FIG. 11, the dimension S2 of the stem 194 is smaller than the dimension R1 of the receptacle 324, which gives the stem 194 space to move within the receptacle 324. In some embodiments, the dimension S2 of the stem 194 is between about 30% and about 60% of the dimension R1 of the receptacle 324. In one embodiment, the dimension S2 of the stem 194 is about 50% of the dimension R1 of the receptacle 324.

In addition, as illustrated in FIG. 12, the dimension S1 of the stem 194 is between about 30% and about 60% of a dimension R2 of the receptacle 324. In one embodiment, the dimension S1 of the stem 194 is about 50% of the dimension R2 of the receptacle 324. Accordingly, the base 108 can float both in several directions, e.g., forwardly, rearwardly, sideways, and combinations thereof, to a displacement of between about 1 mm and about 6 mm from the locked configuration. In one embodiment, the base 108 can float to a displacement of about 4 mm from the locked configuration. Additionally, the base 108 can float vertically on the floor 312 of the doghouse panel 300. As such, the floor 312 of the doghouse panel 300 has a thickness of between about 3 mm and about 5 mm. In some embodiments, the floor 312 has a thickness of about 3.5 mm. Accordingly, the floor 312 can float vertically within the gap 202 of the base 108 due to the relationship between the thickness of the floor 312 and the height H of the gap 202. In this way, the clip 100 by way of the base 108 is configured to float in several directions to facilitate insertion and assembly with the doghouse panel 300 and/or a component.

With reference to FIGS. 11 and 12, the clip 100 is configured to be assembled with the doghouse panel 300 and to be attached to a component 400. The component 400 includes a hole 404 through which the foot 164 of the main body 104 can be inserted to secure the component 400 to the clip 100 and the doghouse panel 300. To that end, an exemplary attachment process includes aligning the main body 104 of the clip 100 with the hole 404 of the component 400, which is facilitated by the clip 100 being configured to float within the receptacle 324 of the doghouse panel 300. Then, a user can press down on the contact surface 120 of the head 112 so that the arms 140 bend about the hinges 152 to compress and allow the head 112 to move toward the base 108. In doing so, the main body 104 of the clip 100 translates downwardly through the central passage 198 of the base 108 until the braces 132 contact the top flange 170. At the same time, the legs 156 of the main body 104 are compressed inwardly toward the longitudinal axis C and into the channel 136 while being translated downwardly through the hole 404 in the component 400 until the rims 160 of the legs 156 are located beneath the component 400. Then, the legs 156 spring back outwardly and away from one another so the component 400 is secured between the rims 160 of the legs 156 and the upper portion 124 of the shaft 116 of the main body 104. Accordingly, the component 400 is configured to be secured to the doghouse panel 300 and the clip 100. In some embodiments, the component 400 is formed of metal, or composites, or some material that is dissimilar to the material with which the doghouse panel 300 and/or the clip 100 is formed. As a result, the component 400 may react differently to temperature changes as compared to the doghouse panel 300 or the clip 100. The clip 100 and the doghouse panel 300 are configured to allow for float in several directions, which accommodates such differences in reaction to temperature changes when securing components of dissimilar materials.

It will be appreciated that the main body 104 and the legs 156 are configured for particular force requirements, such that a user need only exert a certain insertion force to move the legs 156 through the hole 404 of the component 400. In some embodiments, the main body 104 is configured for an insertion force between about 30 Newtons (N) and about 60 N. In some embodiments, the main body 104 is configured to have an insertion force no greater than 45 N, although other configurations are possible. Further, the main body 104 is configured to secure components of a particular thickness or of varying thicknesses. In some embodiments, the main body 104 is configured to secure components having a thickness between about 1 mm and about 2 mm. In some embodiments, the main body 104 is configured to secure a component having a thickness of about 1.75 mm, although other configurations are possible. In addition, the main body 104 may be configured to secure a component having a hole diameter of between about 4 mm and about 8 mm. In some embodiments, the hole diameter is between about 5 mm and about 7 mm.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

The invention claimed is:

1. A clip for a fastener assembly, the clip comprising:
   a main body; and
   a base that includes a pair of fingers that each have a nub, wherein the fingers extend from opposing ends of the base and the nubs are centrally disposed between the opposing ends,
   wherein the clip defines a longitudinal axis that extends centrally through the main body and the base,
   wherein the main body includes a head and a shaft that extends from the head coaxial with the longitudinal axis, and
   wherein the main body includes a channel that extends through the head and the shaft.

2. The clip of claim 1, wherein the base includes a gap that is defined between a top flange and a bottom flange.

3. The clip of claim 2, wherein the base includes a stem that extends between the top flange and the bottom flange, and wherein the stem is surrounded by the gap.

4. The clip of claim 1, wherein the nubs protrude from a tip of each finger.

5. The clip of claim 1, wherein the nubs are spaced apart a first distance and a receptacle in which the base is configured to be received defines a second distance, and wherein the first distance is greater than the second distance.

6. The clip of claim 1, wherein the base defines a central passage through which the main body of the clip is configured to translate.

7. The clip of claim 1, wherein at least one of the fingers extends from a front end of the base toward a rear end of the base.

8. The clip of claim 1, wherein the clip is monolithically formed of a plastic material.

9. A fastener assembly, comprising:
   a clip that includes a base and a main body; and
   a doghouse panel, wherein the doghouse panel includes a floor that has a receptacle located between a pair of apertures, wherein the base of the clip is configured to be received within the receptacle and engaged with the pair of apertures,
   wherein the clip defines a longitudinal axis that extends centrally through the main body and the base,
   wherein the main body includes a head and a shaft that extends from the head coaxial with e longitudinal axis, and
   wherein the main body includes a channel that extends through the head and the shaft.

10. The fastener assembly of claim 9, wherein the apertures of the doghouse panel are spaced apart a first distance and the receptacle defines a second distance that is less than the first distance.

11. The fastener assembly of claim 10, wherein the base includes a pair of fingers that each include a nub, and wherein the nubs are spaced apart a third distance that is substantially equal to the first distance.

12. The fastener assembly of claim 11, wherein the nubs are disposed equidistant from the longitudinal axis.

13. The fastener assembly of claim 9, wherein the base includes a stem that extends between a top flange and a bottom flange, and wherein a gap surrounds the stem.

14. The fastener assembly of claim 13, wherein, when the clip and the doghouse panel are assembled, a portion of the floor of the doghouse panel is received within the stem.

15. A fastener assembly, comprising:
   a clip that includes a main body and a base, wherein the base has a top flange and a bottom flange that are connected by a stem, the stem being centrally disposed between a medial side and a lateral side of the base, and a first finger extends from the top flange on the medial side; and
   a doghouse panel that includes a receptacle in which the base of the clip is configured to be received,
   wherein the clip defines a longitudinal axis that extends centrally through the main body and the base,
   wherein the main body includes a head and a shaft that extends from the head coaxial with the longitudinal axis,
   wherein the main body includes a channel that extends through the head and the shaft,
   wherein, when the clip is assembled with the doghouse panel, the bottom flange and the top flange of the base are configured to be disposed on opposing sides of a floor of the doghouse panel and the stem of the base is configured to be received within the receptacle.

16. The fastener assembly of claim 15, wherein the longitudinal axis that is centrally disposed between the medial side and the lateral side of the base, and wherein the first finger is diametrically opposed to a second finger relative to the longitudinal axis.

17. The fastener assembly of claim 15, wherein the first finger is configured to engage an aperture that is formed in the floor of the doghouse panel to secure the base to the doghouse panel in a locked position.

18. The fastener assembly of claim 15, wherein the base and the doghouse panel are configured to move relative to one another while remaining assembled together.

19. The fastener assembly of claim 15, wherein a component is configured to be secured to the fastener assembly by engagement with the main body of the clip, and wherein the component is made of a different material than at least one of the clip or the doghouse panel.

* * * * *